INVENTOR
George W. Beute
BY
[signature], ATTORNEY

Patented Aug. 31, 1954

2,687,708

UNITED STATES PATENT OFFICE 2,687,708

VAPOR GENERATING UNIT WITH RISER PLATENS THROUGH GAS FLOW CHAMBER

George W. Beute, Cedar Grove, N. J., assignor to The Babcock & Wilcox Company, New York, N. Y., a corporation of New Jersey Application August 7, 1951, Serial No. 240,673

3 Claims. (Cl. 122—333)

1

This invention relates to a high capacity vapor generating unit having a cyclone furnace disposed beneath a large volume a secondary furnace chamber and so constructed as to present an arrangement resulting in improved circulatory characteristics for the cooling system.

More specifically, the invention is concerned with high capacity steam generating installations having a cyclone furnace including a primary furnace chamber, the circulation of the cooling fluid through the tubes defining the walls of the cyclone furnace or cyclone combustion chamber being enhanced by long upright riser tubes connected to the wall tubes and extending as vertical platens through a vertically elongated heat exchange zone.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated an embodiment of the invention.

Figure 1:
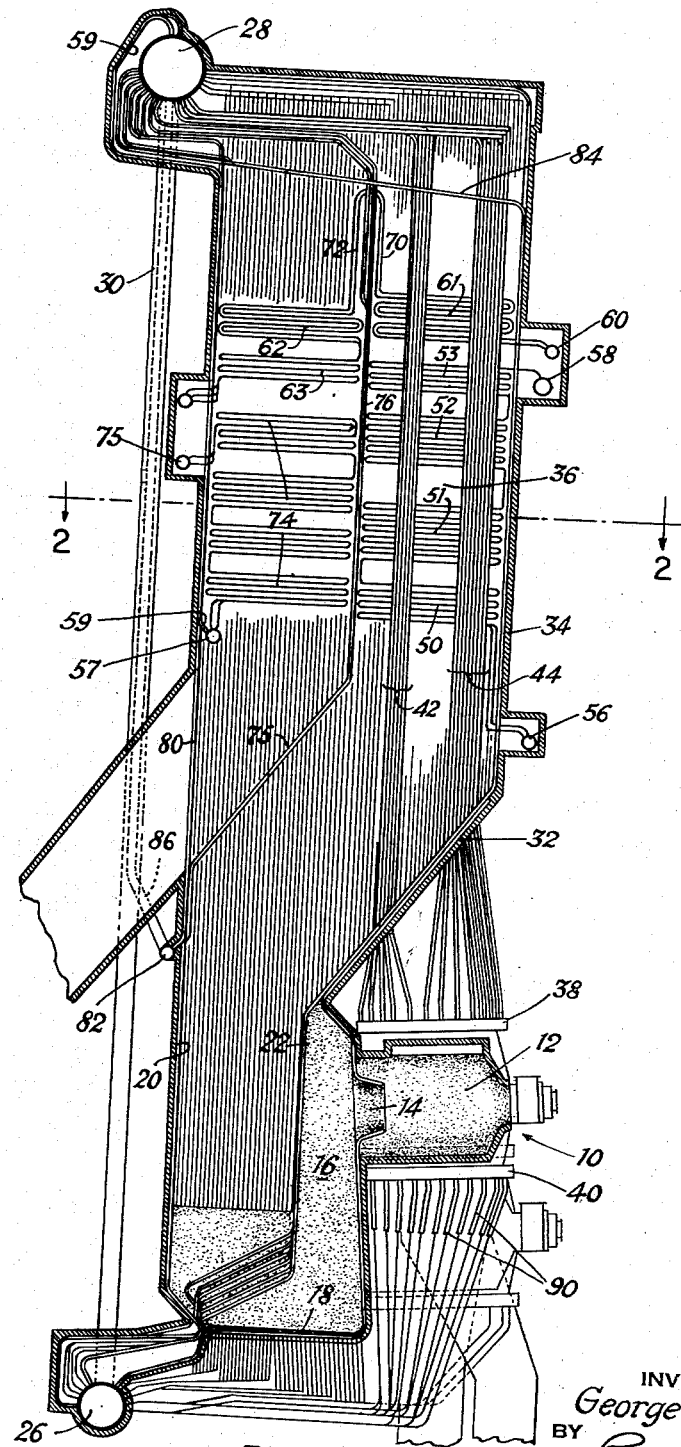
Fig. 1 is a sectional elevation of a high capacity steam generating unit fired by a cyclone furnace.

Fig. 1 shows a cyclone furnace 10 having a combustion chamber 12 of the type shown in the U. S. patent to Bailey et al. 2,357,301, September 5, 1944. This fuel burning cyclone is fired by pulverized fuel at high temperatures, and the furnace gases with particles of slag in suspension exit from the cyclone combustion chamber 12 through the opening 14 into the primary furnace chamber, a part of which is indicated at 16. Slag deposited on the floor 18 of the primary furnace chamber flows out of that chamber in the manner indicated by the patent above referred to.

From the primary furnace chamber the gases pass upwardly to a vertically elongated secondary furnace chamber, the walls of which include wall tubes such as 20 and 22 connected into the natural circulation system of the unit through connections to the lower drum 26 and steam and water drum 28. These two drums are directly connected by the downcomer 30.

The secondary furnace chamber has a vertically inclined wall section 32 extending downwardly to the left from the upright wall section

2

Figure 2:
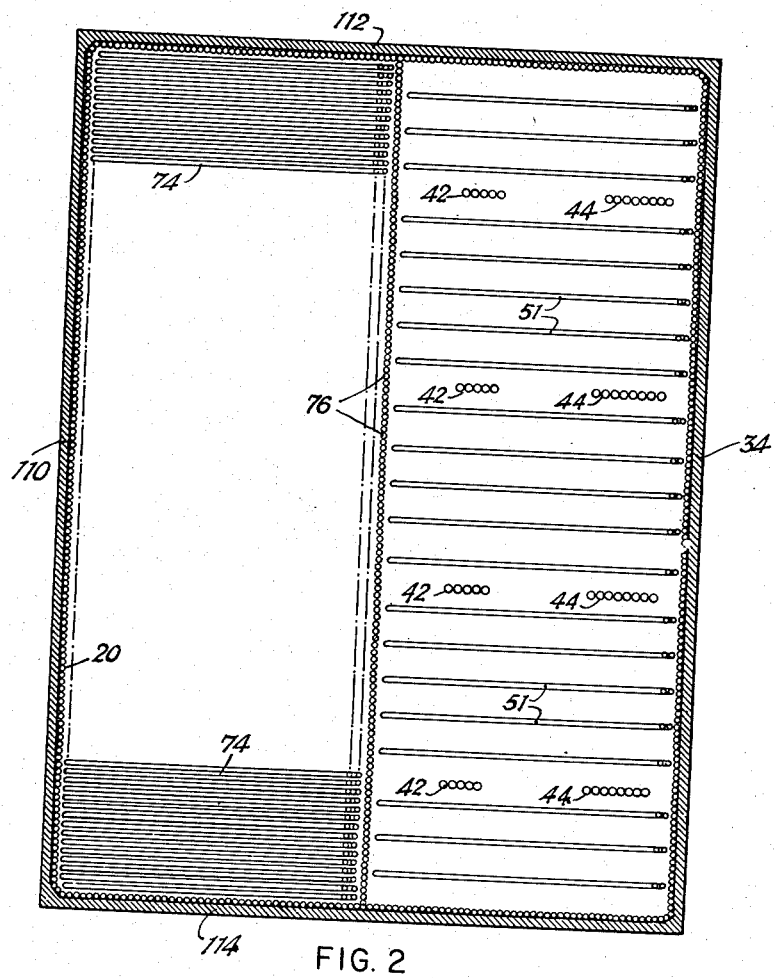
Fig. 2 is a horizontal section on the line 2—2 of Fig. 1.

34, and thereby affording a position (or offset space) for the cyclone furnaces and their wall cooling systems directly underneath the upflow convection heat exchange chamber 36. Each cyclone, or cyclone combustion chamber, has an axially extending upper header 38 and a similarly positioned lower header 40 which are connected by semi-circular tube sections defining the walls of the cyclone furnace. The upper header is directly connected to vertically extending risers which lead through the vertically inclined wall 32 and form the riser platens 42 and 44 extending through a part of the secondary furnace chamber and through the superposed convection heat exchange chamber. These rows of platens are distributed across the installation as indicated in Fig. 2, this figure showing four pairs of the platen groups, corresponding to the use of four cyclone furnaces as indicated in Fig. 3 of the drawings.

The pairs of platens 42 and 44 are interposed relative to vertically arranged coils or platens of the tubes of a secondary superheater. These coils consist of series connected return bend tubes and they are arranged in spaced groups such as indicated at 50—53 in Fig. 1. The primary superheater 74 is in downflow gas pass. Steam is supplied to the primary superheater inlet header 57 by appropriate connections 59, leading from the steam space of the drum 28. From header 57 steam passes through the coils of the primary superheater 74 to the outlet header 75, and thence through an attemperator to the inlet header 56 of the secondary superheater. Steam then passes through the coils of the groups 50—53 to the outlet header 58 and then may pass to a turbine or other point of use. From an intermediate stage of the turbine the steam may pass to the inlet header 60 of the reheater. This reheater consists of the groups 61—63 of series connected return bend coils conducting steam from the header 60 to the outlet header 66. Tubes of the groups 61 and 62 are connected by upright tubes 70 and 72 extending across the gas outlet at the upper part of the convection heat exchange chamber 36.

The groups of reheater tubes 62 and 63 and the similar groups of tubes comprising the primary superheater 74 are disposed in a downflow gas pass separated from the secondary furnace chamber by a wall including the vertically inclined wall tubes 75 and the associated upright tubular sections 76. These tubes, together with rear wall tubes 80, extend upwardly from an auxiliary rear wall header 82 to positions above the roof 84 which is defined by parts of the steam generating tubes and appropriately interposed heat resisting material. Above the roof, all of these tubes are directly connected to the drum 28 as clearly shown in Fig. 1. This figure also indicates an auxiliary downcomer 86 directly connecting the water space of the drum 28 to the auxiliary header 82. The lower header 40 for each cyclone is directly connected to the lower drum 26, by the circulators 90, indicated in Figs. 1 and 3. This arrangement of tubes for the circulatory system of the cyclone furnace provides a fairly direct flow of water to and from the cyclone wall tubes, and the circulation of cooling fluid through these tubes is enhanced by the arrangement of the riser platens 42 and 44 which are exposed to heat absorption on both sides of the platens.

Figure 3:
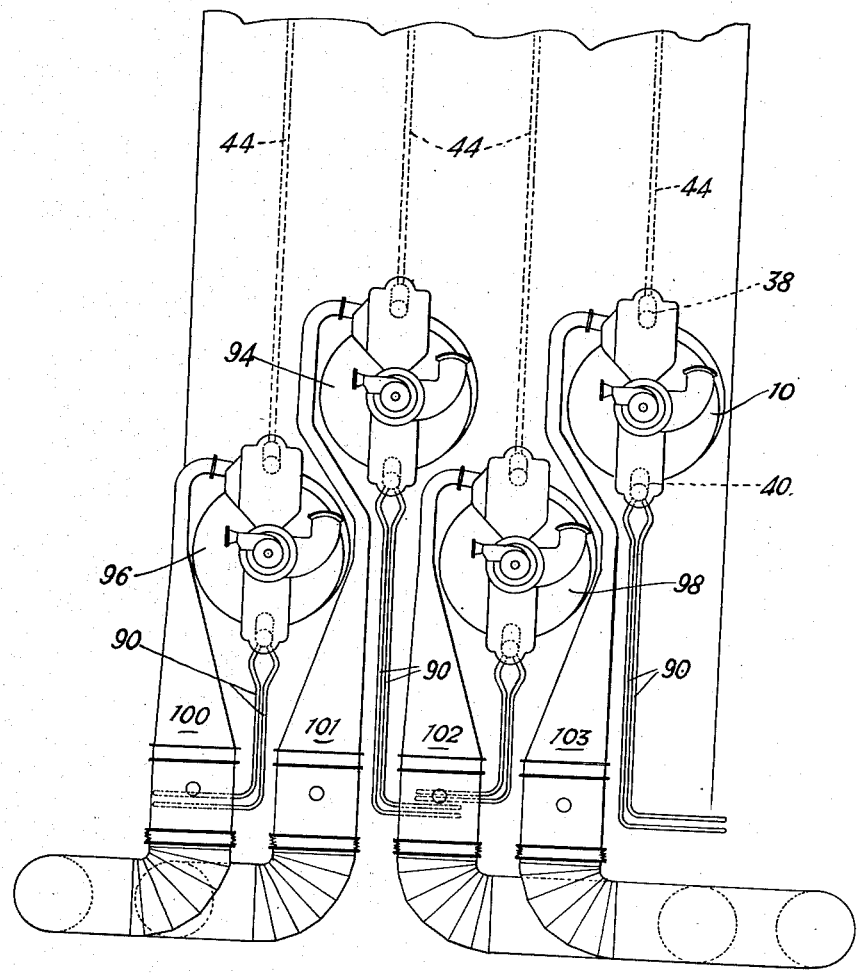
Fig. 3 is a partial front view.

Fig. 3 illustrates an arrangement of four cyclone furnaces 10, 94, 96, 98, with the separate cyclone furnaces being separately supplied with fuel and primary air through the ducts 100—103, each cyclone furnace being otherwise constructed and connected into the system as indicated in Fig. 1 in the above indicated description.

The upflow and downflow gas passes of the convection heat exchange chambers present a combined structure of rectangular cross-section as indicated in Fig. 2. The rear wall 110, as well as side walls 112 and 114, include upright steam generating tubes connected into the circulatory system of the unit in the manner indicated in Fig. 1.

What is claimed is:

1. In a vapor generating unit for operation at high fluid temperatures and pressures, upright vapor generating wall tubes defining the front and rear walls and connecting side walls of a vertically elongated secondary furnace chamber, fuel burning means including a cyclone furnace disposed beneath a part of the secondary furnace chamber, other wall tubes constituting vapor generating tubes included in the walls of the cyclone furnace, and circulatory tubes connecting the cyclone furnace wall tubes into the fluid circulation of the unit; some of said circulatory tubes having parts forming widely spaced, vertically disposed platens extending in parallelism into gas flow in the vertically elongated secondary furnace chamber and distributed across the unit, said platens also extending along and in parallelism with the front wall of the vertically elongated secondary furnace chamber and extending over a substantial proportion of the horizontal section of the vertically elongated secondary furnace chamber, the tubes of each platen being arranged in a row transverse to the plane of the front wall.

2. In a high temperature vapor generating installation, upright vapor generating wall tubes defining a vertically elongated chamber including a secondary furnace chamber together with an upflow gas pass leading therefrom and a downflow gas pass leading from the top of the upflow gas pass, some of the vapor generating tubes defining a wall disposed directly beneath the upflow gas pass, said wall defining a boundary of a space inset from the vertical plane of one wall of the installation, cyclone fuel burning furnaces having combustion chambers, said cyclone furnaces being disposed in said inset space and connected so as to discharge high temperature combustion products into the lower part of the secondary furnace chamber for subsequent flow through the gas passes, a circulatory system of vapor generating tubes included in the walls of the combustion chambers of the cyclone furnaces and including upright platens of riser tubes extending vertically from the combustion chamber of each cyclone furnace through the gas flow in the upflow gas pass, and upright platens of superheater tubes disposed between the riser platens from the separate combustion chambers of the cyclone furnaces and transversely of gas flow.

3. In a steam generating installation, walls including upright steam generating tubes defining a vertically elongated secondary furnace chamber and upflow and downflow gas passes arranged for series flow of the gaseous products of combustion from the gas entry zone of the secondary furnace chamber, a steam and water drum to which the upper ends of the tubes are connected, a lower water drum, tubular downcomer means connecting both drums, some of said tubes defining a space inset from the vertical plane of one wall of the installation and at a position below the upflow gas pass, a cyclone furnace disposed in said inset space, the walls of the furnace including curved steam generating tubes, an inlet header to which the lower ends of the last mentioned steam generating tubes are connected, an upper header having the outlet ends of said curved tubes connected thereto, means connecting the inlet header into the water circulating system of the installation, steam generating tubes presenting upright risers having their lower ends connected to the upper header and forming thereabove spaced platens of vertically arranged tubes extending through the upflow gas pass leading from the secondary furnace chamber, said platens being arranged in a plurality of rows across the upflow gas pass, and a convection superheater including upright platens or coils of series connected return bend tubes disposed in the upflow gas pass at positions between the riser platens.

References Cited in the file of this patent

UNITED STATES PATENTS

| Number | Name | Date |
| --- | --- | --- |
| 2,293,040 | Bailey | Aug. 18, 1942 |
| 2,397,523 | Bailey | Apr. 2, 1946 |

OTHER REFERENCES

B & W Central Station Boilers, Bulletin G67 (copyright 1949), page 30.